United States Patent [19]
Piercey

[11] 3,750,900
[45] Aug. 7, 1973

[54] TRAFFIC CONE RETRIEVER

[76] Inventor: Robert D. Piercey, 238 N.W. Garden Balley Blvd., Roseburg, Oreg. 97470

[22] Filed: Jan. 19, 1971

[21] Appl. No.: 107,735

[52] U.S. Cl.............. 214/6 B, 214/6 D, 214/6.5, 214/83.26, 214/520, 214/522
[51] Int. Cl............................................... B60p 1/36
[58] Field of Search............... 214/6 B, 6.5, 83.26, 214/520, 522, 6 D; 198/7–11

[56] References Cited
UNITED STATES PATENTS

| | | | |
|---|---|---|---|
| 2,599,838 | 6/1952 | Kandoll | 214/83.26 |
| 2,702,131 | 2/1955 | Leupke | 214/6 B |
| 3,493,136 | 2/1970 | Spellman, Jr. | 214/522 X |
| 3,513,991 | 5/1970 | McWilliams | 214/41 X |
| 3,537,247 | 11/1970 | Hungate | 214/6 B X |

*Primary Examiner*—Albert J. Makay
*Attorney*—Clarence A. O'Brien and Harvey B. Jacobson

[57] ABSTRACT

A motorized land vehicle including a forwardly displaced and opening scoop discharging rearwardly onto the lower end of a rearwardly and upwardly inclined endless conveyor discharging rearwardly at a location with which a transversely shiftable upwardly opening receptacle is registered. The upper discharge end of the conveyor assembly discharges laterally into the front side of the upper portion of the receptacle and the vehicle is adapted to move along a roadway and sequentially engage and pick up traffic cones from the roadway for conveying the cones rearwardly and upwardly along the conveyor assembly for subsequent discharge into the receptacle for automatic stacking therein. The rear end portion of the vehicle includes transversely spaced longitudinally extending isles which may be sequentially filled with stacks of retrieved traffic cones and the conveyor assembly and forwardly displaced scoop are mounted on the vehicle for lateral shifting transversely of the latter and for oscillation of the conveyor assembly and forwardly displaced scoop about a horizontal transverse axis spaced intermediate the opposite ends of the conveyor assembly whereby the forward lower end of the conveyor assembly may be elevated above the roadway for transit from one location to another while the upper rear end of the conveyor assembly is lowered downward toward a support position with the conveyor assembly generally horizontally disposed. The forward end portion of the conveyor assembly which supports the forwardly disposed scoop is articulated for upward swinging movement of the forward scoop supporting end of the conveyor assembly relative to the remainder thereof and the vehicle includes a forwardly and upwardly displaceable operator's cab for shifting to a forwardly and upwardly displaced position during traffic cone retrieving operations of the vehicle.

14 Claims, 10 Drawing Figures

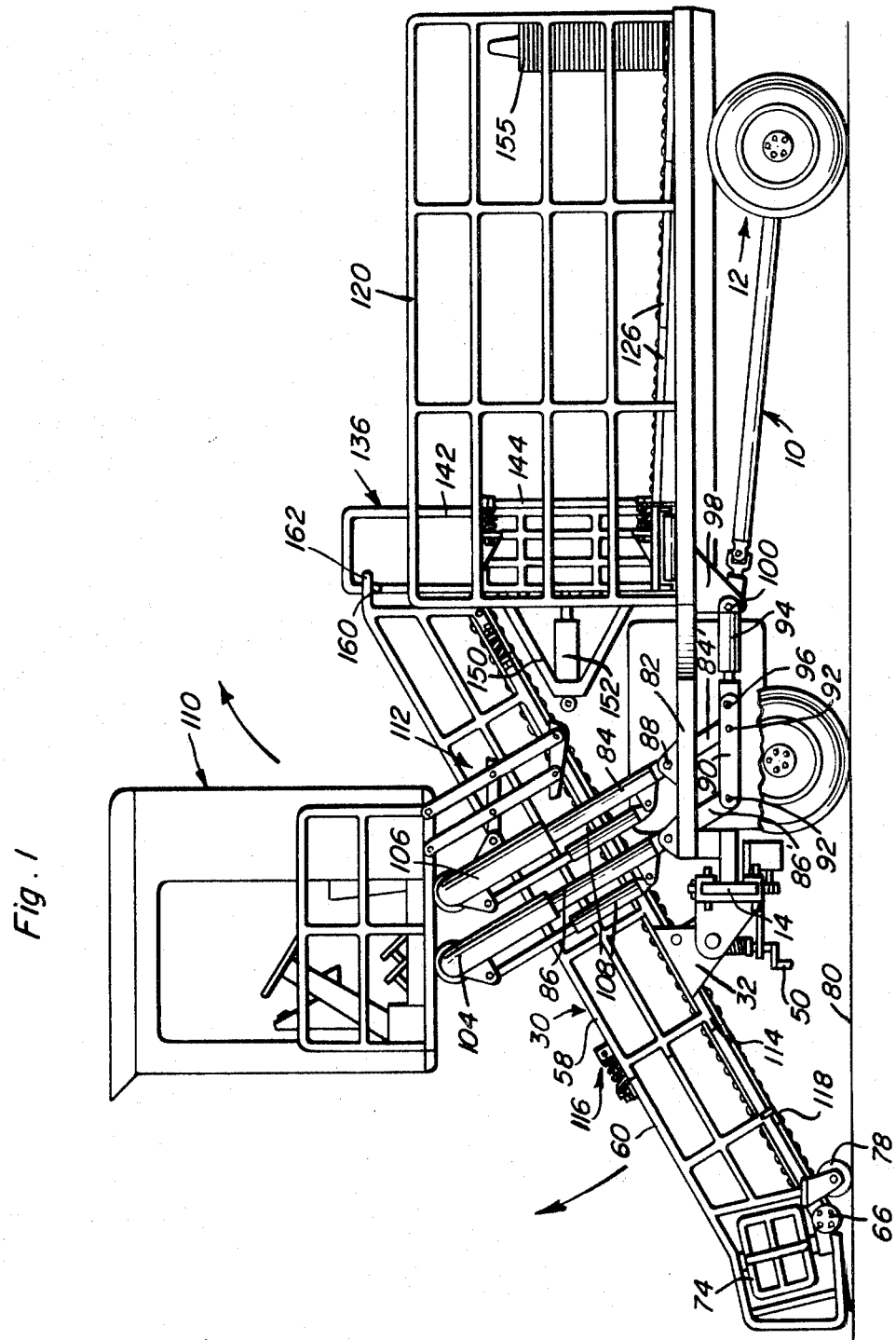
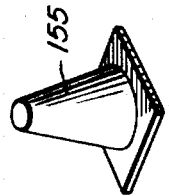
Fig. 1
Fig. 10
Robert D. Piercey
INVENTOR.

PATENTED AUG 7 1973

Robert D. Piercey
INVENTOR.

BY *Clarence A O'Brien
and Harvey B. Jacobson*
Attorneys

Robert D. Piercey
INVENTOR.

Robert D. Piercey
INVENTOR.

BY *Clarence A. O'Brien*
and *Harvey B. Jacobson*
Attorneys

TRAFFIC CONE RETRIEVER

This invention relates to a traffic cone retriever that mechanically retrieves traffic cones used in connection with paint stripping of all hard surfaced roads or freeway systems. Presently, the traffic cones are set on the freshly painted center lines, skylines and shoulder lines of roads. After the paint is dry, these traffic cones must be retrieved for reuse.

Normally, in painting traffic lines, there will be approximately 75 to 100 traffic cones used per mile of painted line. Considering the number of miles of roads and freeway systems to be painted, the amount of traffic cones employed by various governmental agencies is astronomical in number. This invention will expedite and facilitate this traffic cone retrieving process.

The present invention utilizes a traffic cone retrieving process which is more economical than the present methods used. One such present method utilizes a large-type truck with a seat constructed at the rear of the bed of the truck close to the pavement so that a workman can grasp the individual traffic cones by hand when the route of the truck is parallel and close enough to the traffic cones. This procedure normally involves three workmen including the truck driver, the cone picker and the cone stacker who stacks the retrieved cones in the bed of the truck. This process is relatively slow and it is furthermore hazardous in that there is usually no attempt made to stop traffic while this work is being done. Not only is a road service vehicle operating with the usual flashing caution lights, but this large type truck operation presents a very slow moving obstruction to free traffic and the slow rate of speed which must be employed merely magnifies the unsafe operation.

The main object of this invention is to provide a device with the capability to retrieve traffic cones from the center lines, skylines or shoulder lines of roadways or freeway systems while the device is moving over such roads or freeway systems as a considerably greater rate of speed than has been possible heretofore.

Another object of this invention is to provide a mechanism that will be capable of conveying, stacking and storing the retrieved traffic cones by mechanisms under the control of the driver of the vehicle.

Still another object of this invention is to provide a traffic cone retrieving vehicle that will be capable of at least semi-automatically storing as many as 1,500 to 2,000 traffic cones at one time.

Another object of this invention is to provide a vehicle in accordance with the preceding objects that will have the capability of traveling, when in transit from location to another, at highway speeds.

A further object of this invention, in accordance with the immediately preceding object, is to provide a vehicle which will be capable of retrieving, conveying, stacking and storing traffic cones while the vehicle is traveling in excess of 35 miles per hour.

Another very important object of this invention is to provide a traffic cone retrieving vehicle which will be 100 per cent operative in accordance with the preceding objects under the control of a single workman.

Yet another object of this invention is to provide a traffic cone retrieving vehicle which will, because of its capability of retrieving traffic cones at high speed, reduce the total number of traffic cones needed by the various governmental agencies employing the use of traffic cones.

A final object of this invention to be specifically enumerated herein is to provide a traffic cone retrieving apparatus which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the traffic cone retriever of the instant invention;

FIG. 10 is a perspective view of a conventional form of traffic cone to be retrieved by the machine of the instant invention.

Figure 2:
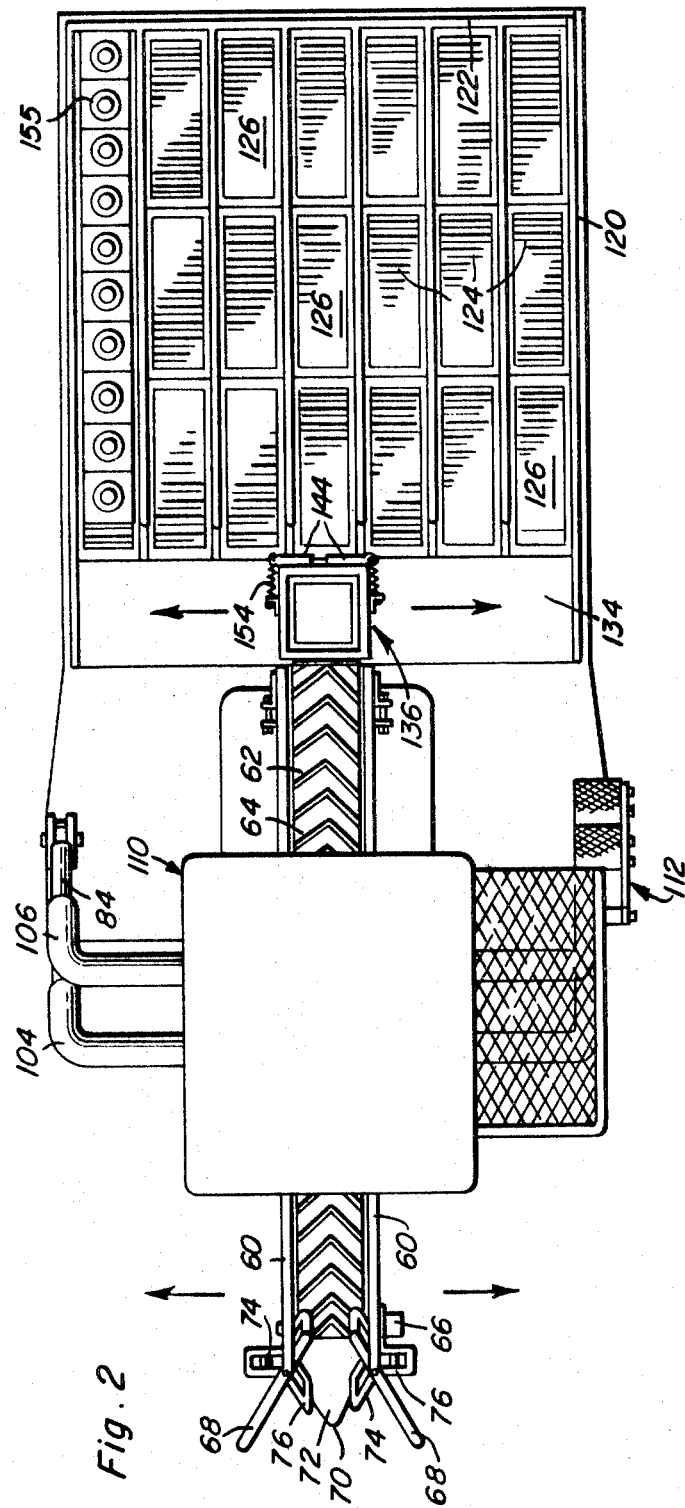
FIG. 2 is a top plan view of the embodiment illustrated in FIG. 1.
Figure 9:
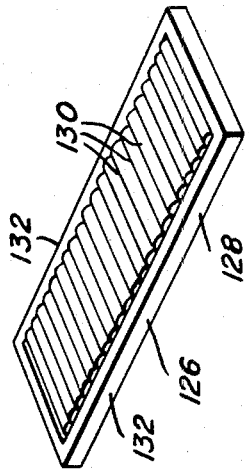
FIG. 9 is a perspective view of one of the roller conveyor sections utilized in rearwardly displacing each stack of retrieved cones into an associated cone storage isle.

This invention is basically concerned with the retrieving, conveying, stacking and storing of traffic cones used in traffic painting of all hard surface roads, freeways or expressway systems.

The traffic cone retriever may utilize any commercially available powered and wheeled chassis of a suitable type and including at least basic construction features adapting it to be conformed into a traffic cone retriever in accordance with the present invention.

The traffic cone retriever of the instant invention is referred to in general by the reference numeral 10 and includes any suitable conventional powered and steerable chassis referred to in general by the reference numeral 12. The front of the chassis 12 is provided with a transverse support beam 14 including rack gear teeth 16 along its lower marginal edge portion. A carriage assembly referred to in general by the reference numeral 18 is mounted on the support beam 14 and includes guide rollers 20 journalled therefrom rollingly engaged with the support beam 14. In addition, the carriage assembly includes a lower motor mount portion 22 from which a motor 24, either electric, penumatic or hydraulic, is supported. The motor 24 includes a rotatable output shaft 26 upon which a gear wheel 28 is mounted and the gear wheel 28 is meshed with the rack gear teeth 16 whereby operation of the motor 24 will cause the carriage assembly 18 to shift transversely of the chassis 12 longitudinally of the support beam 14.

Although the rack gear and companion gear wheel have been illustrated as a means to laterally shift the carriage assembly 18 along the support beam 14, other means such as a sprocket wheel utilized on the output shaft 26 in lieu of the gear wheel 28 could be utilized with that sprocket wheel engaged with a link chain section extending along the support beam 14, anchored relative to the latter and guided so as to be maintained in engagement with the alternate sprocket wheel. In any event, either method of shifting the carriage assembly 18 may include control actuating structure for indicating when the carriage assembly 18 is precisely positioned in any one of seven predetermined locations spaced along the support beam 14 for a purpose to be hereinafter more fully set forth.

A conveyor assembly referred to in general by the reference numeral 30 is provided and includes a pair of depending opposite side mounting plates 32 snugly received between and pivotally supported from a pair of similar forwardly projecting mounting plates 34 carried by the carriage assembly 18. The mounting plates 32 are pivotally supported from the mounting plates 34 by means of pivot bolts 36 and a connecting shaft 38 extends and is secured between the mounting plates 32.

A second pair of apertured mounting plates 40 project forwardly from the carriage assembly 18 and have the lower end of a fluid cylinder 42 pivotally secured therebetween as at 44 while the upper end of the extensible fluid cylinder is mounted on the connecting rod 38. In addition, the carriage assembly 18 includes a forwardly projecting mounting plate portion 46 through which a screw shaft 48 provided with a crank handle 50 is threadedly engaged and the upper end of the screw shaft 48, see FIG. 6, has a spring seat 52 journalled thereon. The left hand mounting plate 32 includes an integral mounting bracket 54 to whose undersurface the upper end of a compression spring 56 is secured and the lower end of the compression spring 56 seats against the spring seat 52. Accordingly, the screw shaft 48 may be rotated to adjust the compression of the spring 56 in any oscillated position of the conveyor assembly 30, which oscillated position is determined by the amount the fluid motor or cylinder 42 is extended or retracted by any suitable attendant fluid pressure system (not shown).

Figure 4:
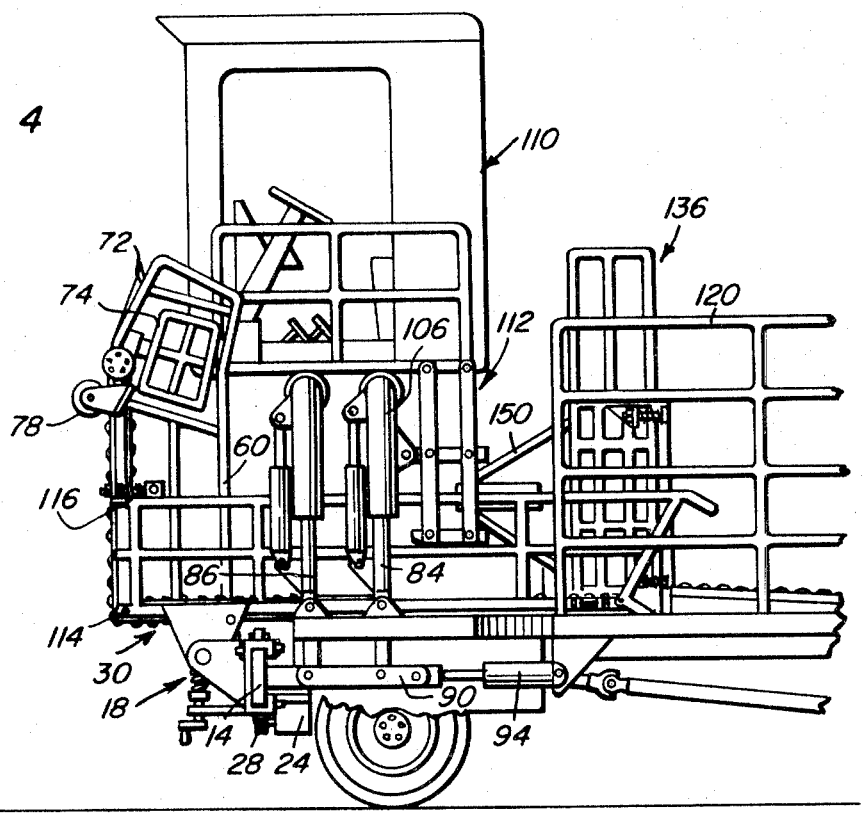
FIG. 4 is a fragmentary side elevational view similar to FIG. 1 but with the scoop supporting conveyor assembly of the retriever in its transport horizontally disposed position having its forward end displaced upwardly and with the operators cab portion disposed in its rearwardly and downwardly displaced transit position.
Figure 5:
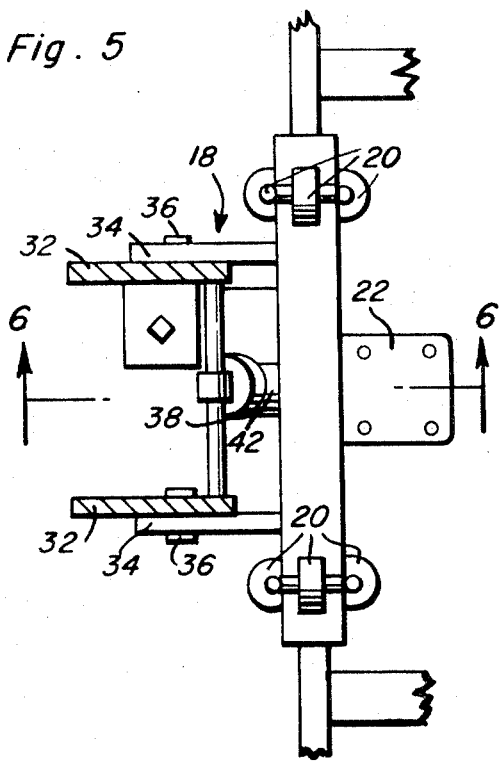
FIG. 5 is an enlarged fragmentary horizontal sectional view illustrating the manner in which the conveyor assembly of the vehicle is mounted thereon for lateral shifting transversely of the latter.
Figure 6:
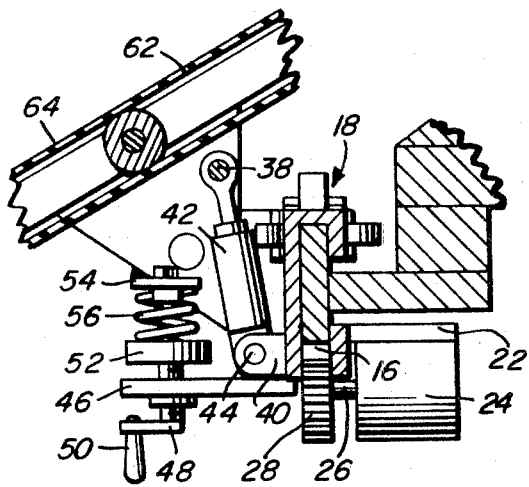
FIG. 6 is a fragmentary vertical sectional view taken substantially upon the plane indicated by the section line 6—6 of FIG. 5.

The conveyor assembly 30 includes opposite side upper and lower railing sections 58 and 60 and the bottom wall of the conveyor assembly 30 is defined by the upper reach 62 of an endless flexible conveyor member 64, see FIG. 6, driven by means of an electric, pneumatic or hydraulic motor 66 carried by the forward lower end of the conveyor assembly 30, see FIGS. 1, 2 and 4.

The forward lower ends of the railing sections 60 are flaired as at 68, see FIG. 2, to define a forwardly opening and rearwardly tapering entrance throat 70 therebetween. In addition, the forward lower end of the conveyor assembly 60 includes a scoop plate 72 disposed at the rear end of the entrance throat 70 and terminating rearwardly at the lower forward end extremity of the upper reach 62 of the conveyor member 64.

A pair of opposite side paddle wheel assemblies 74 are journalled from the forward lower end portions of the railing sections 60 for rotation about upstanding axes and each of the paddle wheel assemblies 74 includes three radially outwardly extending paddle portions 76. The paddle wheel assemblies 74 are also driven from the motor 66 by any suitable power transmission means (not shown) capable of driving the paddle wheel assemblies 74 at speeds corresponding to the speed of the conveyor member 64. Of course, the compression spring 56 is provided to counterbalance the conveyor assembly 30, at least to some extent, and to also provide a means whereby the conveyor assembly 30 will be supported from the carriage assembly 18 at least in a partially floating manner whereby the forward lower end of the conveyor assembly 30 may more readily move up and down in accordance with road surface irregularities. However, the forward lower end of the conveyor assembly 30 includes opposite side support wheels 78 for rolling over the roadway 80 upon which the traffic cone retriever 10 is disposed.

Figure 3:
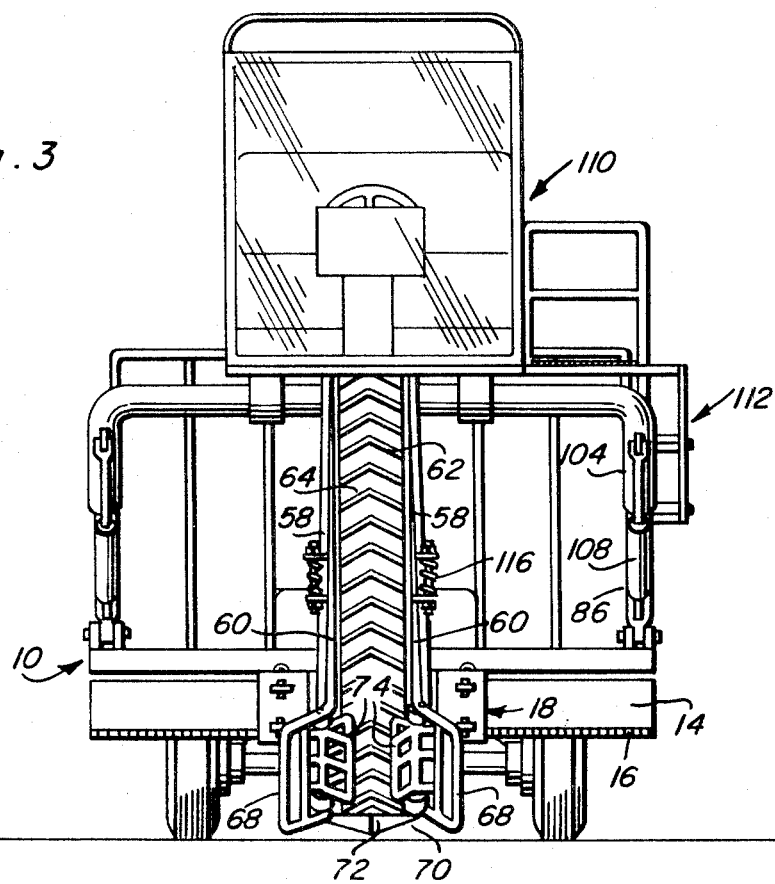
FIG. 3 is a front elevational view of the assemblage illustrated in FIGS. 1 and 2.

With attention now invited more specifically to FIGS. 1, 3 and 4 of the drawings, it may be seen that the chassis 12 includes opposite side forward longitudinal members 82 to which the lower end portions of opposite side pairs of support legs 84 and 86 are pivotally secured as at 88. The legs 84 and 86 include downward extensions 84' and 86' having the opposite ends of pairs of connecting links 90 pivotally secured thereto as at 92 and the rear ends of the connecting links 90 are pivotally secured to the forward ends of a pair of pneumatic or fluid cylinders 94 as at 96. The rear ends of the cylinders 94 are pivotally supported from mounting brackets 98 carried by opposite sides of the chassis 12 as at 100. Accordingly, upon extension and retraction of the cylinders 94 carried by the opposite sides of the chassis 12, the upper ends of the support legs 84 and 86 will be swung rearwardly and forwardly, respectively.

A pair of front and rear U-shaped members 104 and 106 are provided and include downwardly directed tubular opposite ends in which the upper ends of the support legs 84 and 86 are telescopingly received. A hydraulic cylinder 108 is connected between each leg 84 and 86 and the corresponding U-shaped member whereby the U-shaped members 104 and 106 may be extended upwardly and retracted downwardly relative to the support legs 84 and 86.

An operator's cab assembly referred to in general by the reference numeral 110 is supported from the midportions of the U-shaped members 104 and 106 and is therefore extended upwardly with the U-shaped members 104 and 106 during extension of the cylinders 108. Further, the operator's cab assembly 110 may be swung forwardly and rearwardly with the U-shaped members 104 and 106 upon retraction and extension of the cylinders 94. In addition, the operator's cab assembly 110 includes a lazy tongs type of access stepladder referred to in general by the reference numeral 112 supported therefrom whereby access to the cab assembly 110 may be readily gained by the operator of the cone retriever 10.

That portion of the conveyor assembly 30 from which the rail sections 60 are supported is pivotally supported from the forward end portion of the remainder of the conveyor assembly 30 as at 114 and a latch assembly referred to in general by the reference numeral 116 is operative to secure this articulated forward end portion of the conveyor assembly 30 in the operative position thereof illustrated in FIG. 1 of the drawings. In addition, the articulated forward lower end portion of the conveyor assembly 30 includes a latch component 118 with which the latch assemblies 116 may be selectively engaged in order to maintain the forward articulated lower end portion of the conveyor assembly 30 in position with its forward extremities swung upwardly and with the articulated end portion of the conveyor assembly 30 disposed at substantially 90 degrees relative to the remainder of the conveyor assembly 30.

The rear portion of the chassis 12 includes upstanding opposite side walls 120 interconnected at their rear ends by means of a rear wall 122 and the walls 120 and 122 define a load bed therebetween. All but the front marginal edge portion of the load bed disposed between the side walls 120 is defined by seven side-by-side storage aisles 124 and each storage aisle 124 includes three longitudinally aligned and slightly rearwardly and downwardly inclined roller conveyor sections 126 including generally rectangular frames 128 and a plurality of transversely extending and longitduinally spaced rollers 130 journalled from opposite side longitudinal members 132 of each of the frames 128.

Figure 7:
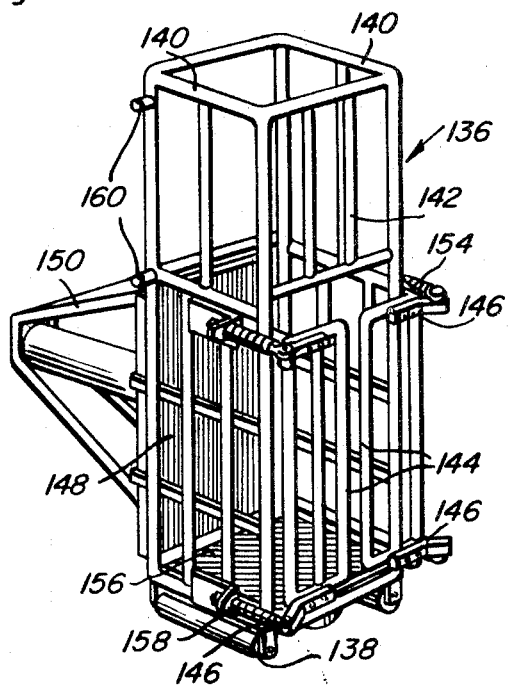
FIG. 7 is a perspective view of the cone stacker or receptacle which is shiftable transversely of the load bed of the traffic cone retriever.

The front marginal edge portion of the load bed defined between the side walls 120 is defined by a forward transversely extending deck 134 and an upstanding container or receptacle referred to in general by the reference numeral 136, see FIG. 7, is disposed upon the deck 134 and provided with lower end supporting rollers 138 for rolling movement of the container or receptacle 136 along the deck 134 transversely of the load bed. The container or receptacle includes opposite side walls 140 and a rear wall 142 including an open lower portion removably closed by means of spring urged gate members 144 pivotally supported from the rear marginal edge portions of the side walls 140 by hinge assemblies 146 for movement between generally parallel closed positions such as those illustrated in FIG. 7 of the drawings and open positions with the free marginal edge portions of the gate members 144 swung rearwardly.

Figure 8:
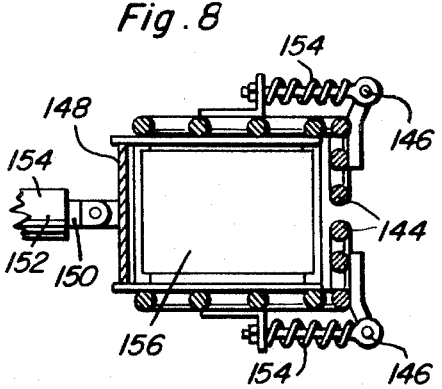
FIG. 8 is a fragmentary horizontal sectional view taken substantially upon a plane passing through the vertical center of the cone stacker or receptacle.

The forward side of the container or receptacle 136 is open at its upper portion and closed at its lower portion by means of an upright push plate 148 carried by the free end of the piston rod portion 150 of a fluid motor 152 whose cylinder portion 154 is supported from a suitable framework 156 supported from the front marginal edge portions of the side walls 140 of the container or receptacle 136. The upper open portion of the container or receptacle 136 disposed above the push plate 148 is disposed in registry with the upper discharge end of the conveyor assembly 30 when the latter in its operative position illustrated in FIG. 1 of the drawings. Accordingly, traffic cones engaged by the scoop plate 74 and the paddle wheel assembly 74 for movement onto the lower end of the upper reach 62 of the conveyor member 64 are ultimately discharged from the upper discharge end of the upper reach 62 for falling downwardly in the container or receptacle 136 to be supported from the bottom wall 152 thereof with each successive traffic cone such as that illustrated in FIG. 10 of the drawings and designated by the reference numeral 155 stacked upon the last cone discharged into the container or receptacle 136. The bottom wall 156 of the container or receptacle 136 may be of the floating type and operatively associated with a pressure switch (not shown) operative to control the actuation of the fluid motor 152 when a sufficient number of traffic cones are stacked within the container or receptacle 136 to actuate the pressure switch whereupon the fluid motor 152 will be actuated to discharge the stack of cones rearwardly between the gate members 144 of the container or receptacle 136. Of course, the gate members 144 are spring urged to the closed positions thereof by means of compression springs 158, see FIGS. 7 and 8, and may therefore be urged toward the open positions by movment of a stack of cones rearwardly from the container or receptacle 136 under the influence of the pressure plate 148. As soon as each stack of cones is rearwardly ejected from the container or receptacle 136 the gate members 144 are free to swing toward their closed positions illustrated in FIGS. 7 and 8 of the drawings.

It will be noted that the side walls 140 of the container or receptacle 136 include laterally outwardly projecting abutments 160. These abutments 160 are engageable by horizontal extensions 162 of the upper rear ends of the railing sections 58 between which the side walls 140 of the container or receptacle 136 are received. Accordingly, the container or receptacle 136 is keyed to the upper rear end of the coneyor assembly 30 for lateral shifting with the latter. However, when the forward lower end portion of the conveyor assembly 30 is swung to the retracted inoperative position thereof illustrated in FIG. 4 of the drawings, the fluid cylinder 42 illustrated in FIG. 6 may be extended to swing the upper end of the conveyor assembly 30 upwardly so as to disengage the extensions 162 from the container or receptacle 136 after which the latter may be shifted toward the extreme right hand side of the chassis 12 and the conveyor assembly 30 may be shifted to the extreme left hand side of the chassis 12 and lowered to the horizontal inoperative transit position illustrated in FIG. 4 of the drawings. Thereafter, the cylinders 94 may be extended to swing the cab assembly 110 rearwardly and upwardly until the support legs 84 and 86 are vertically disposed and thereafter the cylinders 108 may be retracted so as to lower the cab assembly 110 to the transit position thereof illustrated in FIG. 4 of the drawings.

As mentioned hereinbefore, the drive means by which the carriage assembly 18 is shifted transversely of the chassis 12 may include control means for actuating signals for the operator within the cab assembly 110 to determine when the conveyor assembly 30 and container or receptacle 136 are registered with one of the storage aisles 124.

In operation, if the traffic cone retriever 10 is to be utilized in retrieving traffic cones from the extreme right hand side of a traffic lane, the conveyor assembly and container or receptacle 136 may be shifted to the extreme right hand side of the chassis 12. With the conveyor assembly 30 in the operative position thereof illustrated in FIG. 1 of the drawings, the conveyor assembly 30 will be operative to pick up or retrieve traffic cones as the traffic cone retriever 10 is moving at road speeds in excess of 35 miles per hour. As each individual cone is contacted by the scoop plate 72, it is picked up from the roadway and acted upon by the paddle wheel 74 to displace the cone rearwardly onto the lower end of the upper reach 62 of the conveyor 64. Then, the traffic cone is conveyed upwardly along the conveyor assembly 30 and discharged downwardly into the container or receptacle 136. After a predetermined number of cones has been stacked within the container or receptacle 136, the weight of the stacked cones will be sufficient to actuate a weight sensitive switch (not shown) for actuation of the fluid motor 52 whereupon the push plate 148 will eject the stack of traffic cones within the container or receptacle 136 rearwardly through the gate members 142 and into the extreme right hand aisle 124 for movement by gravity to the rear end of the extreme right hand aisle 124. As each aisle 124 becomes filled, the motor 24 may be actuated to laterally shift the conveyor assembly 30 and container or receptacle 136 in registry with the next aisle. Of course, if the traffic cone is to be retrieved or disposed at the extreme left hand marginal portion of a traffic lane, the conveyor assembly 30 and container or receptacle 136 may be shifted to the extreme left hand side of the chassis 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A traffic cone retriever including a mobile chassis having front and rear ends, a rearwardly and upwardly inclined elongated conveyor assembly supported from said chassis and including a lower forward end adapted to be moved along a roadway in close proximity thereto, and an upstanding container supported in registry with the upper discharge end of the conveyor assembly for sequentially receiving traffic cones discharged from the discharge end of said conveyor assembly, said discharge end being registered with the upper end portion of said container whereby the cones discharged into said container from said conveyor assembly may fall by gravity to the lower end portion of the container with each successive cone received by the container stacked on top of the last received cone, said chassis including means defining a storage isle extending longitudinally of said chassis with its forward end registered with the back side of said container, and means operatively associated with said container for intermittently laterally rearwardly ejecting stacks of cones collected in said container into the forward end of said isle, said chassis including a plurality of side-by-side longitudinal storage isles, means supporting said conveyor assembly and said container from said chassis for adjustable shifting transversely thereof whereby said container may be successively registered with the forward ends of each of said storage isles.

2. The combination of claim 1 wherein said storage isle includes a rearwardly and downwardly inclined bottom surface defined by longitudinally extending roller conveyor means, whereby each ejected stack of cones placed in the front of said isle will move by gravity to the rearmost unoccupied portion of said isle.

3. The combination of claim 1 wherein said conveyor assembly is supported, intermediate its opposite ends from a carriage, means supporting said carriage from said chassis for adjustable shifting laterally of the latter.

4. The combination of claim 3 including means supporting said conveyor assembly from said carriage for oscillation relative thereto about a horizontal transverse axis.

5. The combination of claim 4 including means supporting said lower forward end of said conveyor assembly from the remainder of said conveyor assembly for oscillation relative thereto about a horizontal transverse axis, whereby the forward terminal end of said lower forward end may be swung upwardly to a transit position.

6. The combination of claim 1 including an operator's cab assembly supported forwardly and above the transverse forwardly and downwardly inclined plane in which said conveyor assembly is disposed.

7. The combination of claim 6 including means supporting said cab assembly from said chassis for rearward and downward shifting to a transit position.

8. The combination of claim 7 wherein said conveyor assembly is supported intermediate its opposite ends from a carriage means supporting said carriage from said chassis for adjustable shifting laterally of the latter.

9. The combination of claim 8 including means supporting said conveyor assembly from said carriage for oscillation relative thereto about a horizontal transverse axis.

10. The combination of claim 9 including means supporting said lower forward end of said conveyor assembly from the remainder of said conveyor assembly for oscillation relative thereto about a horizontal transverse axis, whereby the forward terminal end of said lower forward end may be swung upwardly to a transit position.

11. A traffic cone retriever comprising a mobile chassis, traffic cone engaging and pick up means carried by said chassis and including a lower inlet for disposition at road level and an elevated discharge end as well as conveyor means for conveying the retrieved cones from said inlet end to said discharge end, cone stacking means registered with the discharge end of said pick up means operative to receive cones discharged therefrom and stack the received cones, said chassis including an elongated generally horizontal storage isle having one inlet end registered with said cone stacking means, said stacking means including cone stack ejecting means operable to eject stacks of cones therefrom into said one end of said isle, said chassis including a plurality of elongated storage isles including a first set of corresponding inlet ends, means supporting said cone stacking means from said chassis for adjustable shifting to positions registered with said storage isle inlet ends.

12. The combination of claim 11 wherein said storage isles are disposed in side-by-side relation, said means supporting said cone stacking means supporting the latter from said chassis for movement along a path with which said corresponding inlet ends are registered.

13. The combination of claim 12 including means supporting said traffic cone engaging and pick up means from said chassis for movement along a second path paralleling said first path, whereby said pick up means and stacking means may be coupled together and moved as a unit during shifting of said stacking means to a position registered with selected storage isle inlet ends.

14. A mobile chassis including front and rear ends, a rearwardly and upwardly inclined elongated conveyor assembly supported from said chassis and including a lower forward end portion adapted to be moved along the surface over which said chassis is being forwardly advanced, the forward end portion of said conveyor projecting forwardly of said chassis, an operator's cab assembly overlaping said conveyor assembly telescopic parallelogram linkage means connected between the forward end portion of said chassis and said operator's cab assembly, said parallelogram linkage means supporting said operator's cab assembly from the forward end portion of said chassis for angular displacement and shifting radially with respect to a horizontal transverse axis disposed below said operator's cab assembly.

* * * * *